Patented Feb. 12, 1935

1,991,272

UNITED STATES PATENT OFFICE 1,991,272

PROCESS OF EXTRACTING METAL VALUES FROM ORES

Harry C. Claflin, Cleveland, and Deane O. Hubbard, Oberlin, Ohio, assignors to The Beryllium Corporation, New York, N. Y., a corporation of Delaware No Drawing. Application October 23, 1931, Serial No. 570,756

3 Claims. (Cl. 23—16)

This invention relates to a method for extracting metal values from ores, particularly ores of the refractory oxide and silicate type.

In Patent No. 1,929,014, issued October 3rd, 1933 on application Serial No. 485,325, of one of us, a process has been described for the recovery of metal values from ores by treating such ores with a mixture of a fluosilicate and a fluride. We have since found it possible to eliminate the use of fluosilicate entirely, thereby making the process far more economical as well as completely cyclic in character.

We have found that if, to an ore containing a metal or metalloid which forms a double fluoride with an alkali or alkaline-earth metal, be added a fluoride of the alkali or alkaline-earth metal, and the mixture now be heated to a temperature over 500° C., and preferably below 1000° C., with the passage of gaseous silicon tetrafluoride over or through the mixture, there is formed a double alkali fluoride of the metal in question. This double fluoride can then be subjected to the usual treatment for the recovery of the metal or its salts.

As an example of our process, we may cite the treatment of beryl by means of sodium fluoride and silicon tetrafluoride. We mix six molecular equivalents of sodium fluoride, or more, with one molecular equivalent of ground beryl, or about 252 parts of sodium fluoride to 537 parts of beryl. The passage of silicon tetrafluoride through the mixture heated to about 600–700° C. results in the transformation of the beryllium in the ore to sodium beryllium fluoride, and the fixing of the silicon content of the tetrafluoride as silicon dioxide. The reaction seems to follow the form—

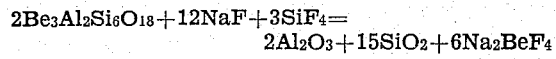

Out of the resulting mass, the soluble sodium beryllium fluoride can readily be leached out, and the beryllium, if desired, precipitated as the hydroxide by means of a fixed alkali or ammonia.

The process may very readily be made cyclic by recovering the fluoride values after the precipitation of beryllium hydroxide by alkali, as by evaporating the resulting sodium fluoride solution. Part of this fluoride can be used for mixing with the next batch of beryl, while the remainder is mixed with silica, either as sodium fluoride, or as precipitated calcium fluoride, for the formation of silicon tetrafluoride by standard processes. By using the insoluble mass remaining behind from the leaching, which contains two molecules of alumina to fifteen of silica, or thereabouts, it is possible to obviate the necessity for adding any outside silica to the process, while obtaining as a by-product of the silicon tetrafluoride formation, a valuable aluminum salt.

As another example, the solubilizing of zircon (or even an oxide ore like baddleyite) may be considered. Adding proportionate potassium fluoride to zircon, and passing silicon tetrafluoride gas over the intimate mixture, finely ground, the resulting reaction may be given as

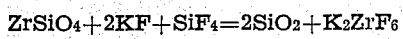

The potassium zirconium floride may be treated, in a manner analagous to that given for beryllium, to obtain zirconium hydroxide and to cycle the process.

The general principle here involved can be applied to any oxide or silicate ore, the metal or metalloid of which forms a double fluoride of the type shown.

The percentages are by weight.

We claim:—

1. The process of extracting beryllium values from an ore such as beryl which comprises mixing the ore with sodium fluoride, heating the mixture, subjecting the mixture to silicon tetrafluoride in amounts materially less than the amount complementary to sodium fluoride in sodium silicofluoride to produce soluble sodium beryllium fluoride, leaching out such soluble fluoride, and recovering the metal values from the filtrate.

2. The process of extracting beryllium values from an ore such as beryl which comprises mixing the ore with sodium fluoride in approximately the proportion of about 537 parts of beryl to about 252 parts of sodium fluoride, heating the mixture, subjecting the mixture to silicon tetrafluoride in amounts materially less than the amount complementary to sodium fluoride in sodium silicofluoride to form soluble sodium beryllium fluoride, leaching out said soluble fluoride, and precipitating beryllium as the hydroxide.

3. A cyclic process of extracting beryllium values from an ore such as beryl which comprises mixing approximately 252 parts of sodium fluoride with approximately 537 parts of beryl, heating the mixture to a temperature between about 500° C. and about 1000° C., passing silicon tetrafluoride gas through the mixture while it is in a heated condition, whereby to produce soluble sodium beryllium fluoride and to fix the silica content of the tetrafluoride as silicon dioxide, leaching out the sodium beryllium fluoride, precipitating the beryllium as the hydroxide by means of a precipitating agent and, for subsequent ore treatments, evaporating the sodium fluoride solution resulting from precipitation of beryllium hydroxide, forming silicon tetrafluoride by reacting the silica content of the insoluble residue remaining after the leaching with a portion of the sodium fluoride produced by evaporation of the sodium fluoride solution resulting from the precipitation of beryllium hydroxide, and mixing the remainder of the sodium fluoride with additional ore in a subsequent treatment, and using the silicon tetrafluoride in such subsequent treatment.

HARRY C. CLAFLIN.
DEANE O. HUBBARD.